(12) United States Patent
Akazawa et al.

(10) Patent No.: US 9,665,806 B2
(45) Date of Patent: May 30, 2017

(54) PRINTING APPARATUS AND CONTROL METHOD OF PRINTING APPARATUS

(71) Applicant: SEIKO EPSON CORPORATION, Tokyo (JP)

(72) Inventors: Akira Akazawa, Matsumoto (JP); Toru Takahashi, Azumino (JP); Tsuneo Kasai, Azumino (JP); Yasuhiro Takeuchi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/095,372

(22) Filed: Apr. 11, 2016

(65) Prior Publication Data
US 2016/0307078 A1  Oct. 20, 2016

(30) Foreign Application Priority Data

Apr. 17, 2015 (JP) ................. 2015-084824

(51) Int. Cl.
*B41J 2/21* (2006.01)
*G06K 15/02* (2006.01)
*H04N 1/00* (2006.01)
*B41J 11/00* (2006.01)

(52) U.S. Cl.
CPC ......... *G06K 15/1823* (2013.01); *B41J 2/2114* (2013.01); *B41J 11/002* (2013.01); *B41J 11/0015* (2013.01); *G06K 15/021* (2013.01); *H04N 1/00724* (2013.01)

(58) Field of Classification Search
CPC ....... B41J 11/0015; B41J 11/02; B41J 2/2114; B41J 2/2114; B41M 5/0011; B41M 7/00; B41M 7/0027; H04N 1/00724; G06K 15/021; G06K 15/023; G06K 15/1823
See application file for complete search history.

(56) References Cited

U.S. PATENT DOCUMENTS

| | | | | |
|---|---|---|---|---|
| 5,305,020 | A * | 4/1994 | Gibbons | B41J 29/48 347/177 |
| 8,804,218 | B2 * | 8/2014 | Katano | B41J 2/2114 347/98 |
| 2005/0243121 | A1 * | 11/2005 | Onishi | B41J 2/2114 347/21 |
| 2012/0148325 | A1 * | 6/2012 | Hakamata | B41J 13/076 400/583 |
| 2013/0027460 | A1 * | 1/2013 | Usuda | B41J 2/2114 347/16 |

FOREIGN PATENT DOCUMENTS

| | | |
|---|---|---|
| JP | 2000-158793 A | 6/2000 |
| JP | 2002-038063 A | 2/2002 |

* cited by examiner

*Primary Examiner* — Julian Huffman
*Assistant Examiner* — Sharon A Polk
(74) *Attorney, Agent, or Firm* — Workman Nydegger

(57) ABSTRACT

A printing apparatus of the invention includes a medium information acquisition section that acquires medium information that can specify a type of a print medium, a printing section that discharges print ink to the print medium, a coating section that coats the print medium with precoat liquid before the printing section performs printing, and a coating control section that controls the coating section. The coating control section variably changes an amount of coating of the precoat liquid per unit area according to the acquired medium information.

6 Claims, 8 Drawing Sheets

FIG. 4A
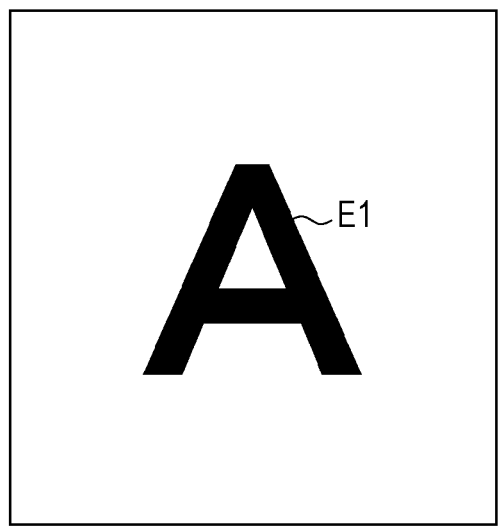
FIG. 4B
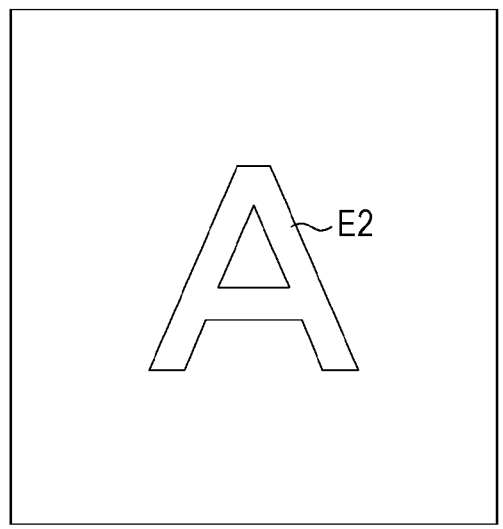
FIG. 5
| TYPE OF BASE MATERIAL | AMOUNT OF COATING |
|---|---|
| SPREADING BASE MATERIAL | DUTY RATIO 1% |
| ABSORBING BASE MATERIAL | DUTY RATIO 100% |
| COLOR BASE MATERIAL | DUTY RATIO 100% |

FIG. 8

| BASE MATERIAL NAME | WET-SPREADING PROPERTY | ABSORBING PROPERTY | COLOR | AMOUNT OF COATING |
|---|---|---|---|---|
| BASE MATERIAL A | ABSENT | PRESENT | CHROMATIC COLOR | DUTY RATIO 100% |
| BASE MATERIAL B | ABSENT | PRESENT | ACHROMATIC COLOR | DUTY RATIO 100% |
| BASE MATERIAL C | ABSENT | ABSENT | CHROMATIC COLOR | DUTY RATIO 100% |
| BASE MATERIAL D | PRESENT | PRESENT | CHROMATIC COLOR | DUTY RATIO 100% |
| BASE MATERIAL E | PRESENT | PRESENT | ACHROMATIC COLOR | DUTY RATIO 100% |
| BASE MATERIAL F | PRESENT | ABSENT | CHROMATIC COLOR | DUTY RATIO 100% |
| BASE MATERIAL G | PRESENT | ABSENT | ACHROMATIC COLOR | DUTY RATIO 1% |
| BASE MATERIAL H | ABSENT | ABSENT | ACHROMATIC COLOR | NO PRECOAT |

PRINTING APPARATUS AND CONTROL METHOD OF PRINTING APPARATUS

BACKGROUND

1. Technical Field

The present invention relates to a printing apparatus and a control method of printing apparatus which perform precoat of a print medium.

2. Related Art

As this type of technique, for example, JP-A-2002-38063 has been known. JP-A-2002-38063 discloses a printing apparatus which hits the entire surface or an image forming area of a print medium with white ink before printing. Because of this configuration, JP-A-2002-38063 has an effect that, even when printing is performed on a print medium whose base color is yellowish, a clear color image can be reproduced without being affected by the base color.

On the other hand, a printing apparatus using an ink jet method which performs printing by using ultraviolet ray curable ink is also known (see JP-A-2000-158793). This type of printing apparatus performs printing by discharging ultraviolet ray curable ink to a print medium and thereafter curing the ultraviolet ray curable ink by irradiating ultraviolet ray.

By the way, it is known that when the ultraviolet ray curable ink is used as in JP-A-2000-158793, the ink permeates the inside of the print medium within a short period of time from the landing of the ink to the curing of the ink, so that deterioration of image quality due to spreading of the ink and color development deterioration due to color fade of color material occur. Therefore, it is considered to perform hitting with white ink before printing (perform the precoat) by applying the technique of JP-A-2002-38063. However, in some print media, the spreading of ink and the color fade of color material hardly occur. Therefore, when using such print media, the precoat is useless. Depending on the material and the base color of the print medium, performing the precoat with white ink may adversely cause degradation of image quality. Further, there is also a problem that when the precoat is performed, the amount of ink consumption increases and a unit price of printed matter increases.

SUMMARY

An advantage of some aspects of the invention is to provide a printing apparatus and a control method of printing apparatus which can appropriately perform the precoat according to a type of print medium while suppressing increase of cost of printed matter.

The printing apparatus according to an aspect of the invention includes a medium information acquisition section that acquires medium information that can specify a type of a print medium, a coating section that coats the print medium with precoat liquid before printing, and a coating control section that controls the coating section. The coating control section variably changes an amount of coating of the precoat liquid per unit area according to the acquired medium information.

The control method of printing apparatus according to an aspect of the invention performs a medium information acquisition step of acquiring medium information that can specify a type of a print medium and a coating step of coating the print medium with precoat liquid before printing. The coating step changes an amount of coating of the precoat liquid per unit area according to the acquired medium information.

According to the configurations of these inventions, the amount of coating of the precoat liquid per unit area is variably changed according to the acquired medium information, so that it is possible to perform the precoat suitable for the print medium. It is possible to suppress an increase of the cost of printed matter by setting the amount of coating per unit area to 0 (zero) when using a print medium where the precoat is not required and by decreasing the amount of coating per unit area when using a print medium where the spreading of ink is small.

The printing apparatus described above is further characterized by including a print data acquisition section that acquires print data and a printing section that discharges print ink to the print medium based on the print data and is also characterized in that the coating control section determines a coating target area, which is an area where the precoat liquid is coated on the print medium, based on the print data.

According to the configuration of this invention, it is possible to perform the precoat only on a necessary area based on the print data. For example, it is considered to specify a print area from the entire surface of the print medium based on the print data and set the specified print area to a coating target area or to specify a non-print area from the entire surface of the print medium based on the print data and set a partial area other than the specified non-print area to the coating target area.

The printing apparatus described above is further characterized in that the coating control section determines a print element area, which is an area where the print ink is coated on the print medium, as the coating target area.

According to the configuration of this invention, the precoat is performed only on the print element area (for example, drawn lines when characters are printed) where the print ink is coated on the print medium, so that it is possible to significantly reduce the consumption of the precoat liquid as compared with a case in which the precoat is performed on the entire surface of the print medium.

The printing apparatus described above is further characterized in that the precoat liquid and the print ink are ultraviolet ray curable ink, the printing apparatus further includes a curing section that cures the ultraviolet ray curable ink, and the curing section includes a first curing section that cures the precoat liquid coated on the print medium before the printing section performs printing and a second curing section that cures the print ink coated on the print medium after the printing section performs printing.

The configuration of this invention can be applied to a printing apparatus that performs printing by using ultraviolet ray curable ink. Further, it is possible to prevent the precoat liquid and the print ink from being mixed together by curing the precoat liquid before printing.

The printing apparatus described above is further characterized in that the medium information is information that can specify a wet-spreading property, an absorbing property, and a base color of the print medium.

According to the configuration of this invention, it is possible to perform precoat suitable for three types of properties, which are the wet-spreading property, the absorbing property, and the base color of the print medium.

The printing apparatus described above is further characterized in that the coating control section determines the presence or absence of the wet-spreading property, the presence or absence of the absorbing property, and whether or not the base color is a chromatic color according to the acquired medium information, when the coating control section determines that there is the absorbing property or the base color is a chromatic color, the coating control section sets the amount of coating of the precoat liquid per unit area to a first value, when the coating control section determines that there is no absorbing property, the base color is not a chromatic color, and there is the wet-spreading property, the coating control section sets the amount of coating of the precoat liquid per unit area to a second value smaller than the first value, and when the coating control section determines that there is no absorbing property, the base color is not a chromatic color, and there is no wet-spreading property, the coating control section does not apply the precoat liquid.

According to the configuration of this invention, in the case of a print medium having the absorbing property and a print medium of chromatic color, it is possible to prevent color development deterioration due to color fade of color material and hue change due to effect of base color by performing precoat with a large amount of coating. In the case of a print medium having no absorbing property and being achromatic but having the wet-spreading property, by performing precoat with a small amount of coating, it is possible to prevent the spreading (bleeding) of the print ink while suppressing the consumption of the precoat liquid. Further, in the case of a print medium having no absorbing property and no wet-spreading property and being achromatic, no precoat is performed, so that it is possible to eliminate useless consumption of the precoat liquid.

BRIEF DESCRIPTION OF THE DRAWINGS

The invention will be described with reference to the accompanying drawings, wherein like numbers reference like elements.

FIG. 4A is a diagram showing a print element area where print ink is coated and FIG. 4B is a diagram showing a coating target area where precoat liquid is coated.

FIG. 5 is a diagram showing an example of a table in which a type of base material and the amount of coating of precoat liquid per unit area are associated with each other.

FIG. 8 is a diagram showing an example of a table related to a first modified example.

DESCRIPTION OF EXEMPLARY EMBODIMENT

The printing apparatus according to an embodiment performs precoat (white plate forming) by using a white ultraviolet ray curable ink (precoat liquid, hereinafter referred to as "UV ink") and is characterized by variably changing the amount of coating of precoat liquid per unit area according to a set type of print medium. Hereinafter, the printing apparatus will be described in detail with reference to the drawings.

Figure 1:
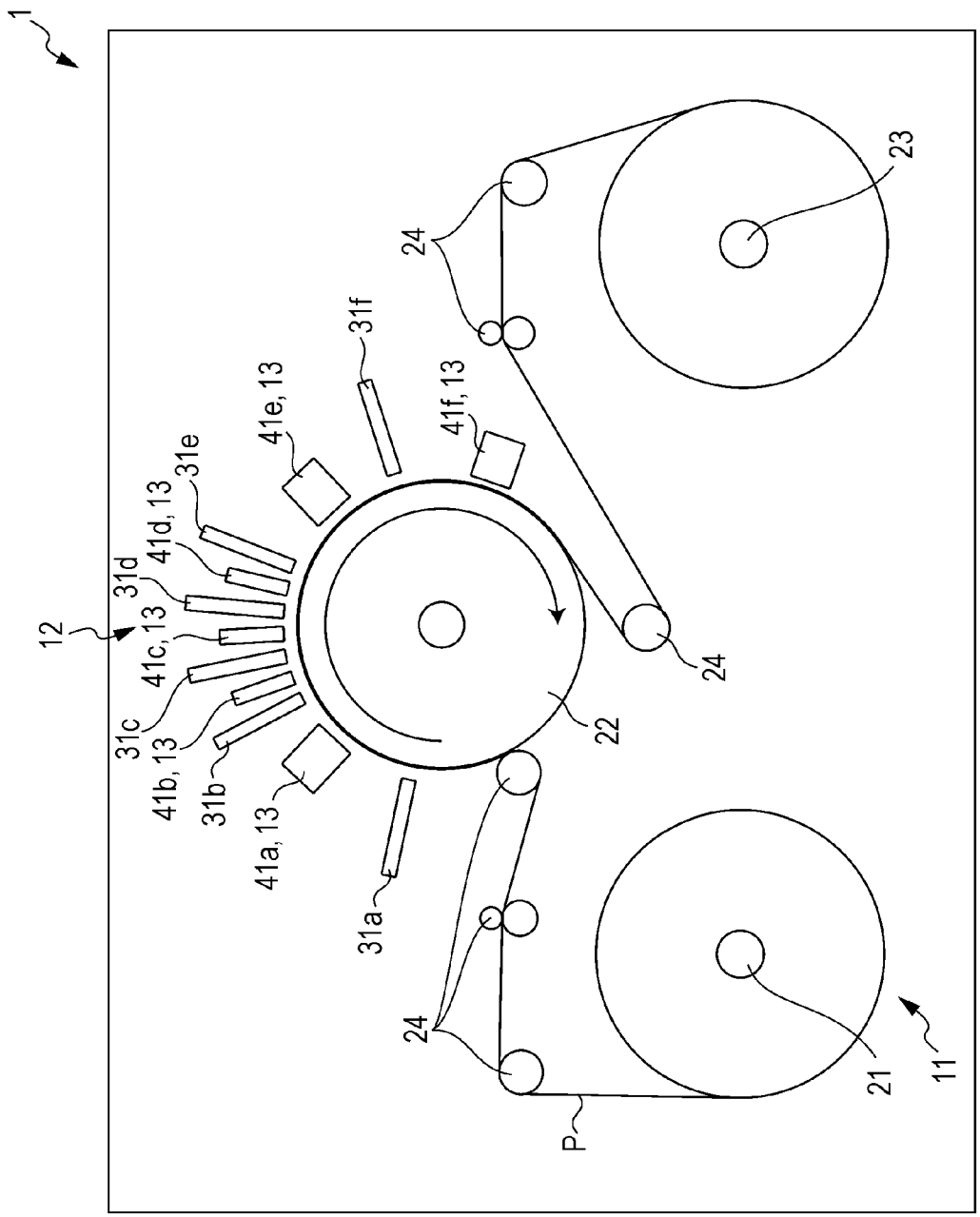
FIG. 1 is a schematic diagram of a printing apparatus according to an embodiment of the invention.
Figure 2:
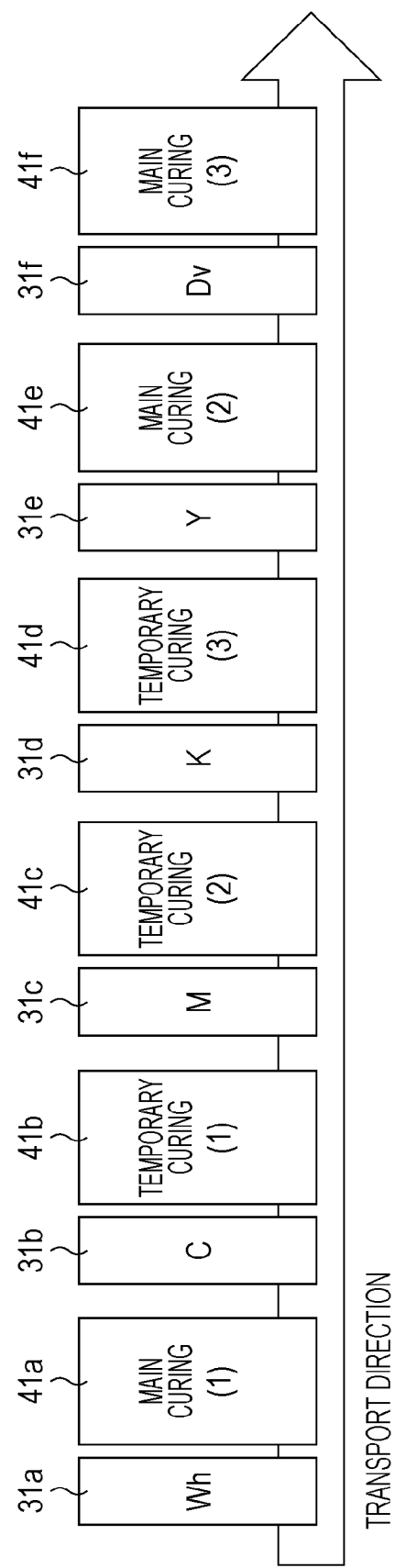
FIG. 2 is an explanatory diagram of an ink discharge mechanism and an ultraviolet ray irradiation mechanism.

FIG. 1 is a schematic diagram of a printing apparatus 1. FIG. 2 is an explanatory diagram of an ink discharge mechanism 12 and an ultraviolet ray irradiation mechanism 13. As shown in FIG. 1, the printing apparatus 1 includes a transport mechanism 11 that transports a print medium P, which is continuous forms, by a roll-to-roll method, the ink discharge mechanism 12 that discharges (prints) the UV ink to the print medium P, which is being transported, by using an ink jet method, and the ultraviolet ray irradiation mechanism 13 that cures the UV ink coated on the print medium P by ultraviolet ray irradiation.

The transport mechanism 11 includes a supply reel 21 that supplies the print medium P wound in a roll shape, a rotating drum 22 that transports the supplied print medium P while holding the supplied print medium P, a winding reel 23 that winds up the print medium P, which is transported from the rotary drum 22, in a roll shape, and a plurality of rollers 24 that defines a transport path of the print medium P around the rotating drum 22.

The print medium P is held on an outer circumferential surface of the rotating drum 22 by a frictional force and is transported along the outer circumferential surface of the rotating drum 22 by rotation of the rotating drum 22. On the other hand, an ink discharge mechanism 12 faces a part of the outer circumferential surface of the rotating drum 22 and discharges the UV ink to the print medium P being transported. In other words, the rotating drum 22 functions as a platen which supports the print medium P and faces the ink discharge mechanism 12 (head units 31a to 31f described below) with the print medium P in between.

The ink discharge mechanism 12 includes six head units 31a to 31f arranged along the outer circumferential surface of the rotating drum 22. Each head unit 31a to 31f is arranged so as to face the outer circumferential surface of the rotating drum 22 through a platen gap.

Each head unit 31a to 31f has a plurality of ink jet heads (not shown in the drawings) arranged in a zigzag pattern in a direction (hereinafter referred to as a "paper width direction") perpendicular to the transport direction so as to form a print line corresponding to the entire width of the print medium P. Each ink jet head has a nozzle array including a plurality of discharge nozzles aligned in the paper width direction and the UV ink is discharged from each discharge nozzle.

On the other hand, as shown in FIG. 2, each head unit 31a to 31f corresponds to an ink of a color different from each other and discharges an ink of the corresponding color. Specifically, the head units 31a to 31f discharge the UV inks of white (Wh), cyan (C), magenta (M), black (K), yellow (Y), and clear (Dv), respectively, in order from the upstream side in the transport direction.

Among them, the UV ink of white is used as a precoat liquid. The precoat means to form a substrate of a whit ink layer. The UV inks of cyan, magenta, black, and yellow are used to form a color image. Hereinafter, these color inks of cyan, magenta, black, and yellow are referred to as "print inks". Further, the ink of clear is used to cover the formed color image and to cause the color image to generate glossy feeling or matte feeling. The ink of clear is printed on the entire surface of the print medium P so as to cover the color image.

On the other hand, as shown in FIGS. 1 and 2, the ultraviolet ray irradiation mechanism 13 includes six irradiation units 41a to 41f corresponding to the six head units 31a to 31f. The irradiation units 41a to 41f are arranged in the downstream side in the transport direction of the corresponding head units 31a to 31f, respectively. In other words, the head units 31a to 31f and the irradiation units 41a to 41f are alternately arranged in the transport direction.

Among the six irradiation units 41a to 41f, three irradiation units 41b to 41d corresponding to the head units 31b to 31d of cyan, magenta, and black are irradiation units for temporary curing (for pinning). In FIG. 2, the expressions "temporary curing (1)", "temporary curing (2)", and "temporary curing (3)" mean that first temporary curing is performed by the irradiation unit 41b, second temporary curing is performed by the irradiation unit 41c, and third temporary curing is performed by the irradiation unit 41d. The temporary curing irradiation units 41b to 41d cure print ink so that a wet-spreading state of the print ink landed on the print medium P (a landed dot) is a predetermined state (to a degree not to be completely cured).

Among the six irradiation units 41a to 41f, three irradiation units 41a, 41e, and 41f corresponding to the head units 31a, 31e, and 31f of white, yellow, and clear are irradiation units for main curing. In FIG. 2, the expressions "main curing (1)", "main curing (2)", and "main curing (3)" mean that first main curing is performed by the irradiation unit 41a, second main curing is performed by the irradiation unit 41e, and third main curing is performed by the irradiation unit 41f. The main curing irradiation units 41a, 41e, and 41f completely cure the UV ink landed on the print medium P by irradiating ultraviolet rays whose accumulated light amount is greater than that of the temporary curing irradiation units 41b to 41d.

Figure 3:
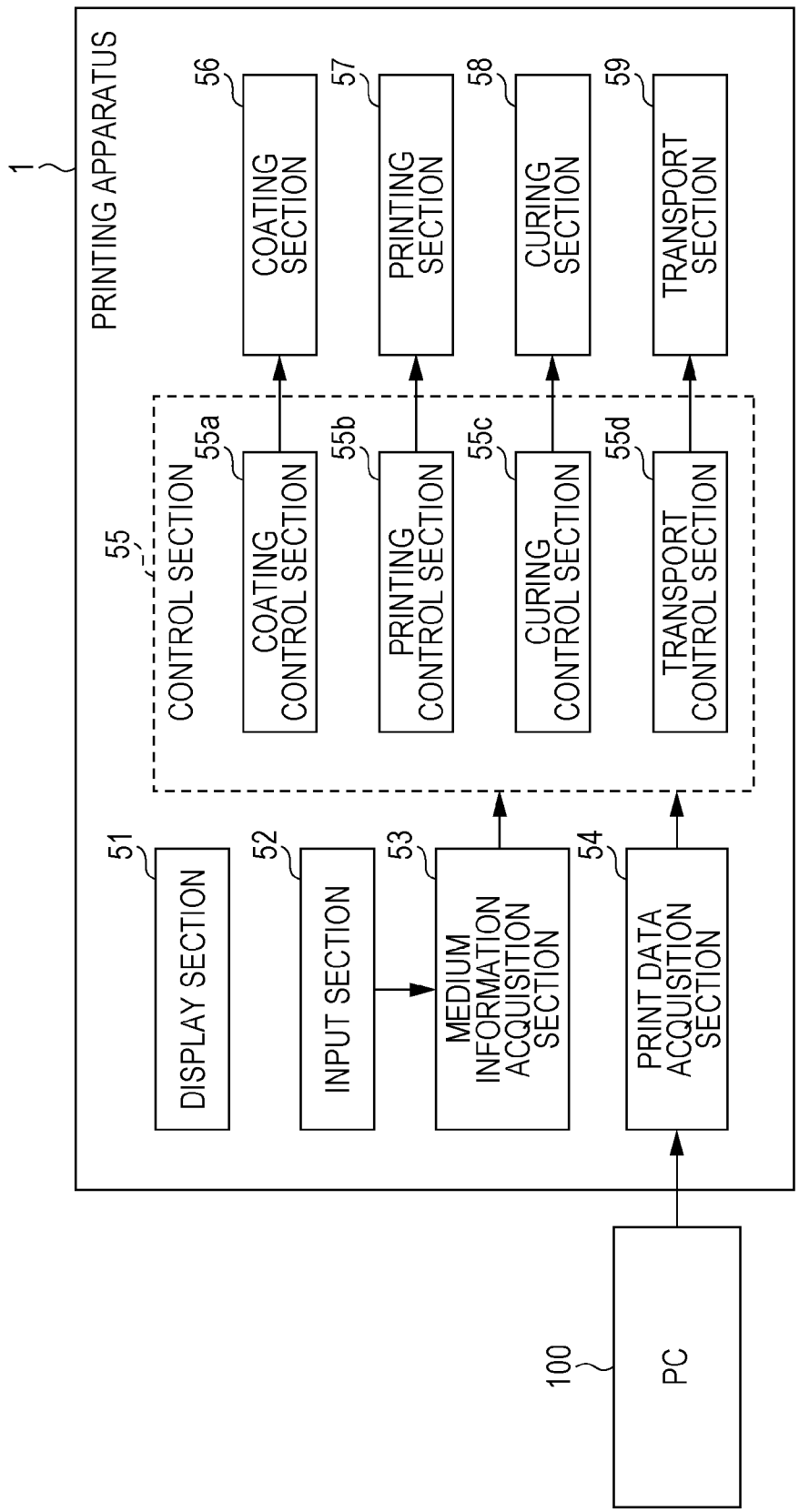
FIG. 3 is a block diagram showing a functional configuration of the printing apparatus.

Next, functional components of the printing apparatus 1 will be described with reference to FIG. 3. As main functional components, the printing apparatus 1 includes a display section 51, an input section 52, a medium information acquisition section 53, a print data acquisition section 54, a control section 55, a coating section 56, a printing section 57, a curing section 58, and a transport section 59.

The display section 51 displays various setting screens and various information. In the embodiment, the display section 51 is mainly used by a user to set the type of the print medium P (base material) and the presence or absence of the precoat (see FIGS. 6A to 6C). The input section 52 is used to input information to the various setting screens and to select an item.

The medium information acquisition section 53 acquires medium information from a result of input to a setting screen from the input section 52. The medium information indicates information that can specify the type of the print medium P. In the embodiment, the medium information acquisition section 53 acquires information whether or not the print medium P to be used corresponds to any one of "spreading base material", "absorbing base material", and "color base material" as the medium information. Here, the "spreading base material" indicates the print medium P having a wet-spreading property (having a wet-spreading property greater than a specified value) such as a porous base material. The "absorbing base material" indicates the print medium P having an absorbing property (having an absorbing property greater than a specified value) such as a high quality paper and a textured base material. The "color base material" indicates the print medium P whose base color is a chromatic color.

The print data acquisition section 54 acquires print data from a PC 100 (Personal Computer) which is a higher-level apparatus. The print data may be acquired from an information processing terminal such as a tablet terminal other than the PC 100. Further, print data read from an external storage medium may be acquired or print data generated by the printing apparatus 1 based on an input result of the input section 52. Further, the medium information may be acquired from the PC 100 or an information processing terminal other than the PC 100 or may be acquired by reading from an external storage medium instead of acquiring an input result of the input section 52.

The coating section 56 coats the print medium P with the precoat liquid before printing and uses the ink discharge mechanism 12 (the white head unit 31a) as a main section. The printing section 57 discharges the print ink to the print medium P and uses the ink discharge mechanism (the head units 31b to 31e of cyan, magenta, black, and yellow) as a main section. The white UV ink coated from the white head unit 31a may also be used as the precoat liquid and the print ink.

The curing section 58 cures the ultraviolet ray curable ink and uses the ultraviolet ray irradiation mechanism 13 as a main section (the irradiation units 41a to 41f). The curing section 58 includes a first curing section and a second curing section. The first curing section uses the irradiation unit 41a, which cures the precoat liquid coated on the print medium P before the print ink is discharged, as a main section. The second curing section uses the irradiation unit 41e, which cures the precoat liquid coated on the print medium P after the print ink is discharged and before the clear ink is discharged, as a main section. On the other hand, the transport section 59 transports the print medium P along a transport path and uses the transport mechanism 11 as a main section.

The control section 55 includes a CPU (Central Processing Unit), a ROM (Read Only Memory), and a RAM (Random Access Memory) and controls each section in the printing apparatus 1. The control section 55 of the embodiment also includes a coating control section 55a, a printing control section 55b, a curing control section 55c, and a transport control section 55d. The printing control section 55b, the curing control section 55c, and the transport control section 55d control the printing section 57, the curing section 58, and the transport section 59, respectively.

On the other hand, the coating control section 55a controls the coating section 56. Specifically, the coating control section 55a determines a coating target area E2 which is an area where the precoat liquid is coated on the print medium P based on the print data acquired by the print data acquisition section 54 and instructs the coating section 56 to apply the precoat liquid to the coating target area E2. In the embodiment, the coating target area E2 is the same as a print element area E1 which is an area where the print ink is coated on the print medium P by the printing section 57. For example, as shown in FIG. 4A, when the drawn lines of the letter "A" is an print element area E1 (printing element), as shown in FIG. 4B, the drawn lines of the letter "A" is defined as the coating target area E2. In other words, an area where at least one of print inks of cyan, magenta, black, and yellow is discharged is defined as the coating target area E2.

Further, the coating control section 55a variably changes the amount of coating of the precoat liquid per unit area according to the medium information acquired by the medium information acquisition section 53. In the embodiment, the "amount of coating per unit area" is represented as a duty ratio (a drive duty ratio of the head unit 31a). For example, as shown FIG. 5, when the "spreading base material" is selected as the type of base material, the precoat liquid is coated at a duty ratio of 1%. When the "absorbing base material" or the "color base material" is selected, the precoat liquid is coated at a duty ratio of 100%. This is because in the case of "absorbing base material" and "color base material", it is possible to prevent color development deterioration due to color fade of color material and hue change due to effect of base color by setting the amount of coating of the precoat liquid to about the amount of solid coating during printing, while in the case of the "spreading base material", a prevention effect against spreading (bleeding) of print ink can be expected by using one several tenth to one several hundredth of the amount of coating mentioned above. The amount of coating (the duty ratio) shown in FIG. 5 is an example, and the amount of coating (the duty ratio) is not limited to the values shown in FIG. 5.

Figure 6A:
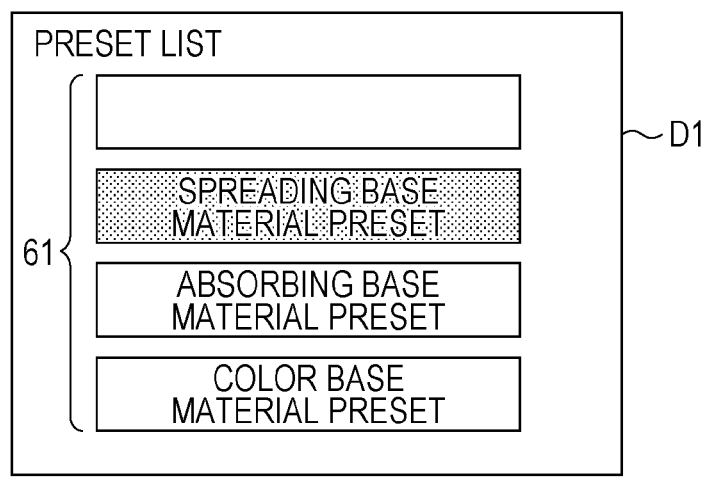
FIGS. 6A to 6C are screen transition diagrams showing a preset procedure related to precoat.
Figure 6B:
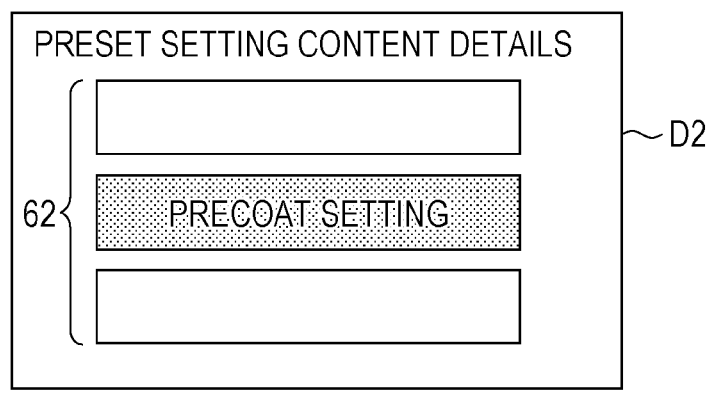
Figure 6C:
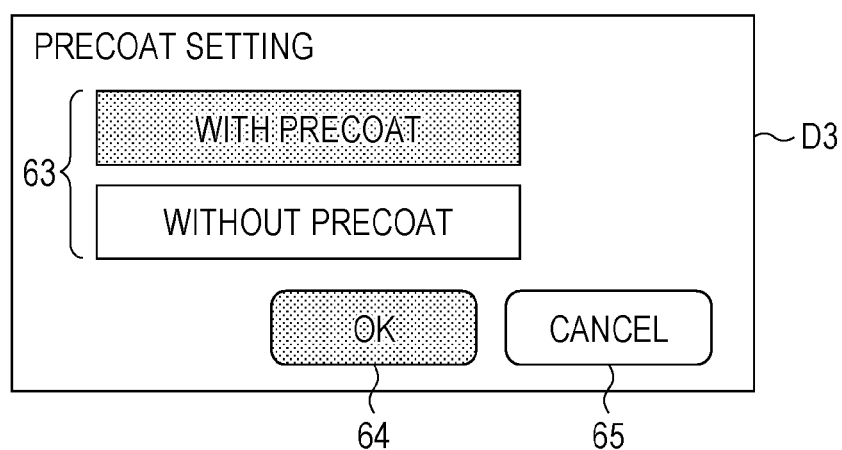

Next, a preset procedure related to the precoat will be described with reference to FIGS. 6A to 6C. The screens shown in FIGS. 6A to 6C are screens displayed on the display section 51. When a preset start operation is performed by a user on an initial screen not shown in the drawings, a preset list screen D1 shown in FIG. 6A is displayed. In the preset list screen D1, a plurality of options such as "spreading base material preset", "absorbing base material preset", and "color base material preset", which correspond to a plurality of medium types, are displayed as an option group 61. A user selects one of options according to the print medium P to be used. In the case of the embodiment, when using the print medium P having an absorbing property or the print medium P of a chromatic color, the "absorbing base material preset" or the "color base material preset" is selected regardless of the presence or absence of the wet-spreading property.

When one option is selected in the preset list screen D1 by the user, a preset setting content details screen D2 shown in FIG. 6B is displayed. In the preset list screen D1, when an option other than the "spreading base material preset", the "absorbing base material preset", and the "color base material preset" is selected, the precoat is not performed because the print medium P is achromatic and does not have the absorbing property and the wet-spreading property.

In the preset setting content details screen D2, detailed setting items such as "precoat setting" are displayed as an option group 62. When the option "precoat setting" is selected by the user, a precoat setting screen D3 shown in FIG. 6C is displayed. In the precoat setting screen D3, "with precoat" and "without precoat" are displayed as an option group 63.

When the option "with precoat" is selected by the user and an OK button 64 is pressed, the precoat is performed with the amount of coating corresponding to the medium type selected on the preset list screen D1 when performing printing. When the option "without precoat" is selected and the OK button 64 is pressed, the precoat is not performed regardless of the medium type selected on the preset list screen D1. When a cancel button 65 is pressed on the precoat setting screen D3, the setting content of the precoat setting screen D3 or all the setting content of the screens D1 to D3 is cancelled.

Figure 7A:
FIGS. 7A to 7C are diagrams showing a processing process of the printing apparatus.
Figure 7B:
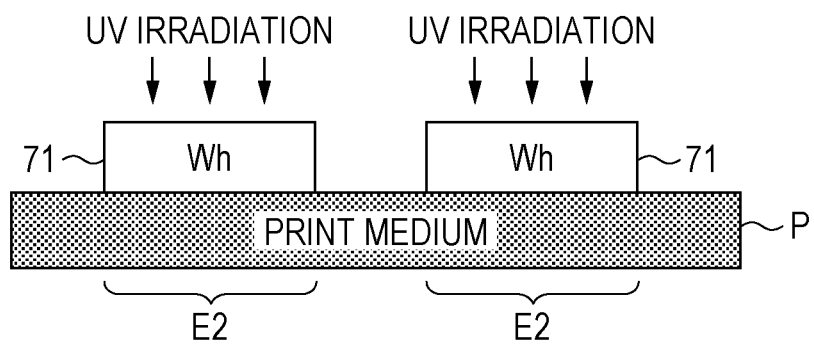
Figure 7C:
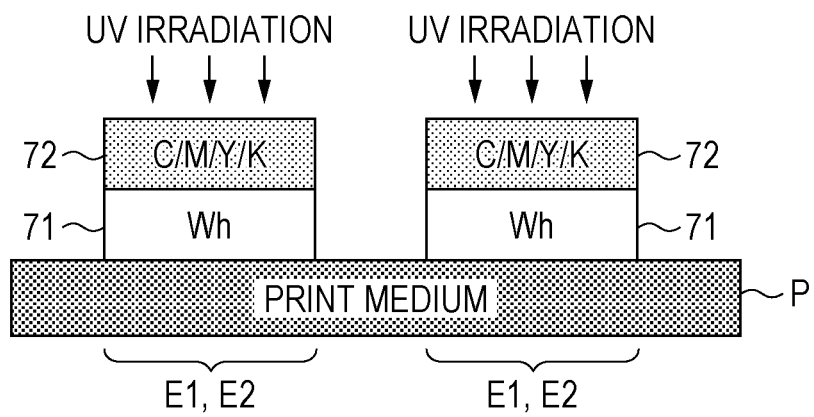

Next, a processing process of the printing apparatus 1 will be described with reference to FIG. 7. FIG. 7A shows a cross-sectional view of the print medium P before being coated with the UV ink. FIG. 7B shows a cross-sectional view of the print medium P after being coated with the precoat liquid (the white UV ink). As shown in FIG. 7B, a white ink layer 71 is formed in the coating target area E2 by the coating of the precoat liquid and thereafter the main curing is performed by the curing section 58. FIG. 7C shows a cross-sectional view of the print medium P after being coated with the print ink (color UV inks). As shown in FIG. 7C, after the coating of the precoat liquid, a color ink layer 72 is formed in the print element area E1 (=the coating target area E2) by the coating of the print ink and thereafter the main curing is performed by the curing section 58.

As described above, according to the embodiment, the amount of coating of the precoat liquid per unit area is variably changed according to the type of the print medium P selected by the user, so that it is possible to perform the precoat suitable for the print medium P. For example, when the "absorbing base material" or the "color base material" is selected as the type of print medium P, it is possible to prevent color development deterioration due to color fade of color material and hue change due to effect of base color by performing precoat with a large amount of coating. When the "spreading base material" is selected, by performing precoat with a small amount of coating, it is possible to prevent the spreading of print ink (prevent deterioration of quality of characters and ruled lines due to bleeding of the print ink) while suppressing the consumption of the precoat liquid. Further, when an option other than the "spreading base material", the "absorbing base material", and the "color base material" is selected, no precoat is performed, so that it is possible to eliminate useless consumption of the precoat liquid. Further, in the embodiment, the print element area E1 where the print ink is coated on the print medium P is used as the coating target area E2 of the precoat liquid, so that it is possible to significantly reduce the consumption of the precoat liquid as compared with a case in which the precoat is performed on the entire surface of the print medium. As described above, in the embodiment, it is possible to perform effective precoat according to the type of the print medium P while suppressing the cost of printed matter by minimizing the consumption of the precoat liquid.

It is possible to employ the following modified examples regardless of the above embodiment.

First Modified Example

In the embodiment described above, regarding the types of the print medium P, the "spreading base material", the "absorbing base material", and the "color base material" are used as options. However, names of the print medium P (base material names) may be used as options. In this case, a table shown in FIG. 8 is stored in the printing apparatus 1. In the table, the base material name, the presence or absence of the wet-spreading property, the presence or absence of the absorbing property, whether or not the base color is a chromatic color, and the amount of coating per unit area (duty ratio) are associated with each other. The printing apparatus 1 determines the presence or absence of the wet-spreading property, the presence or absence of the absorbing property, and whether or not the base color is a chromatic color regarding the print material P of a selected base material name based on the table. As a result of the above, when the printing apparatus 1 determines that there is the absorbing property or the base color is a chromatic color, the printing apparatus 1 sets the duty ratio to 100% (first value) (see the base material A to the base material F). When the printing apparatus 1 determines that the base color is not a chromatic color and there is the wet-spreading property, the printing apparatus 1 sets the duty ratio to 1% (second value) (see the base material G). Further, when the printing apparatus 1 determines that there is no absorbing property, the base color is not a chromatic color, and there is no wet-spreading property, the printing apparatus 1 does not perform the precoat. As described above, according to the first modified example, the base material name can be selected, so that even a user who does not know well about the print medium P can perform appropriate precoat setting.

Second Modified Example

Figure 9A:
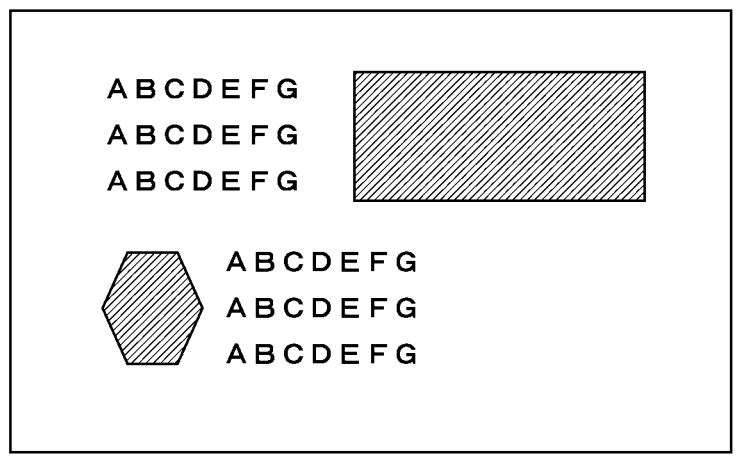
FIGS. 9A to 9C are diagrams showing a setting example of a coating target area related to a second modified example.
Figure 9B:
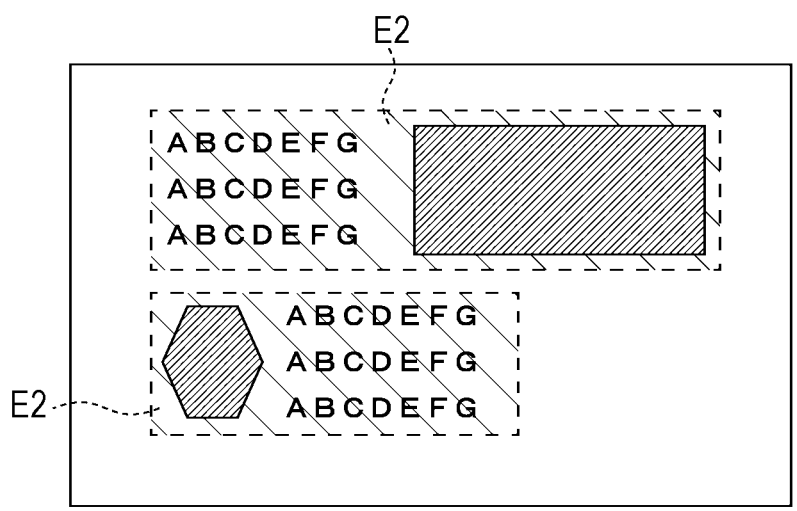
Figure 9C:
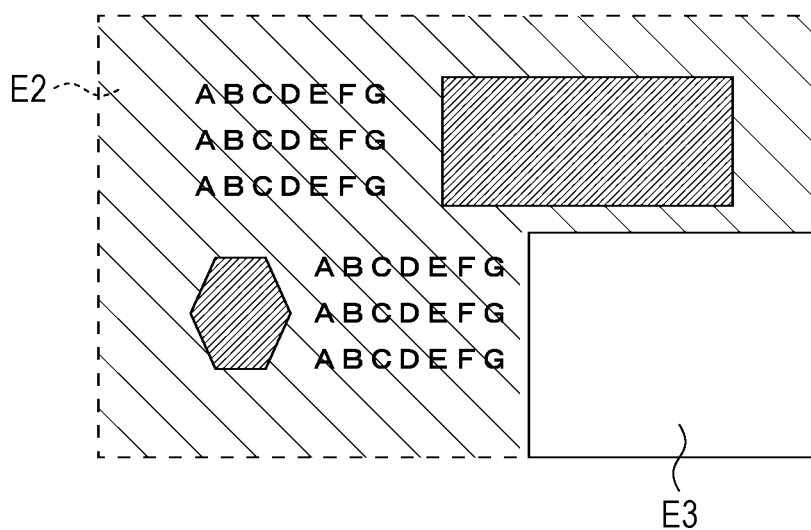

In the embodiment described above, the print element area E1 where the print ink is coated is used as the coating target area E2. However, the coating target area E2 may be determined by another method. For example, to obtain a print result shown in FIG. 9A, the precoat may be performed by using an area enclosed by a dashed line frame in FIG. 9B or 9C as the coating target area E2. In the example of FIG. 9B, a print area (an area where print images such as characters and graphics are formed) is specified based on the print data and the specified print area is defined as the coating target area E2. In the example of FIG. 9C, a non-print area E3 (an area where no print image is formed) is specified based on the print data and a partial area other than the specified non-print area E3 is defined as the coating target area E2. Regarding the print area and the non-print area, the presence or absence of print dot is determined for each unit area obtained by dividing an area on the print medium P into a matrix pattern and then an area where a unit area having a print dot continuously appears may be specified as the print area and an area where a unit area having no print dot continuously appears may be specified as the non-print area.

As a further modified example, the precoat may be applied on the entire surface of the print medium P. Further, a user may select the coating target area E2 from among a plurality of options such as only the print element area E1, only a print area where a print image is formed, and the entire print medium P.

Third Modified Example

In the embodiment described above, the printing apparatus 1 which moves the print medium P with respect to the head units 31a to 31f and discharges and cures the UV ink is exemplified. However, the processing may be performed by moving the head units 31a to 31f with respect to the print medium P. As the print medium P, a sheet of paper may be used instead of continuous forms. The printing sequence of the color inks is not limited to the example of the embodiment but may be optional.

Fourth Modified Example

In the embodiment described above, the precoat is performed by using the white UV ink. However, the precoat may be performed by using UV ink of another color such as clear. The ink color used for the precoat may be variably changed according to the base color and/or the material of the print medium P. The invention can be applied to the printing apparatus 1 that performs printing by using dyes or pigments instead of the UV inks.

Fifth Modified Example

In the embodiment described above, the precoat liquid is coated on the print medium P by using the ink jet method. However, the precoat liquid may be coated by using a method other than the ink jet method. The printing apparatus of the invention may be realized by combining a first apparatus that performs the precoat and a second apparatus that performs printing.

OTHER MODIFIED EXAMPLES

Each component of the printing apparatus 1 described above may be provided as a program. The program may be provided by storing the program in various recording media (CD-ROM, flash memory, and the like). Therefore, a program that causes a computer to function as each component of the printing apparatus 1 and a recording medium that records the program are included in the scope of the right of the invention. In addition, the invention can be appropriately changed without departing from the scope of the invention, such as the control section 55 of the printing apparatus 1 is implemented by cloud computing.

The entire disclosure of Japanese Patent Application No. 2015-084824, filed Apr. 17, 2015 is expressly incorporated by reference herein.

What is claimed is:

1. A printing apparatus, comprising:
   a medium information acquisition section that acquires medium information that can specify a type of a print medium, the medium information is information that specifies a type of the print medium and a base color of the print medium;
   a coating section that coats the print medium with precoat liquid before printing; and
   a coating control section that controls the coating section,
   wherein the coating control section variably changes an amount of coating of the precoat liquid per unit area according to the acquired medium information,
   wherein, the coating control section determines whether or not the type of the print medium is a high quality paper or a textured base material and whether or not the base color is a chromatic color, according to the acquired medium information;
   when the coating control section determines that the type of the print medium is not the high quality paper and the textured base material and the base color is not the chromatic color, the coating control section sets the amount of coating of the precoat liquid per unit area to a first value or the coating control section does not apply the precoat liquid, and
   when the coating control section determines that the type of the print medium is the high quality paper or the textured base material and the base color is the chromatic color, or
   when the coating control section determines that the type of the print medium is the high quality paper or the textured base material and the base color is not the chromatic color, or
   when the coating control section determines that the type of the print medium is not the high quality paper and the textured base material and the base color is the chromatic color,
   the coating control section sets the amount of coating of the precoat liquid per unit area to a second value larger than the first value.

2. The printing apparatus according to claim 1, further comprising:
   a print data acquisition section that acquires print data; and
   a printing section that discharges print ink to the print medium based on the print data,
   wherein the coating control section determines a coating target area, which is an area where the precoat liquid is coated on the print medium, based on the print data.

3. The printing apparatus according to claim 2, wherein the coating control section determines a print element area, which is an area where the print ink is coated on the print medium, as the coating target area.

4. The printing apparatus according to claim 2, wherein the precoat liquid and the print ink are ultraviolet ray curable ink, the printing apparatus further includes a curing section that cures the ultraviolet ray curable ink, and the curing section includes a first curing section that cures the precoat liquid coated on the print medium before the printing section performs printing, and a second curing section that cures the print ink coated on the print medium after the printing section performs printing.

5. A printing apparatus, comprising:

a medium information acquisition section that acquires medium information that can specify a type of a print medium;

a coating section that coats the print medium with precoat liquid before printing; and a coating control section that controls the coating section, the coating control section variably changes an amount of coating of the precoat liquid per unit area according to the acquired medium information that is information that can specify a wet-spreading property, an absorbing property, and a base color of the print medium, the coating control section determines the presence or absence of the wet-spreading property, the presence or absence of the absorbing property, and whether or not the base color is a chromatic color according to the acquired medium information, when the coating control section determines that there is the absorbing property or the base color is a chromatic color, the coating control section sets the amount of coating of the precoat liquid per unit area to a first value, when the coating control section determines that there is no absorbing property, the base color is not a chromatic color, and there is the wet-spreading property, the coating control section sets the amount of coating of the precoat liquid per unit area to a second value smaller than the first value, and when the coating control section determines that there is no absorbing property, the base color is not a chromatic color, and there is no wet-spreading property, the coating control section does not apply the precoat liquid.

6. A control method of printing apparatus, comprising:

acquiring medium information that can specify a type of a print medium and a base color of the print medium; and coating the print medium with precoat liquid before printing, wherein a coating section changes an amount of coating of the precoat liquid per unit area according to the acquired medium information, wherein, when the type of the print medium is not the high quality paper and the textured base material and the base color is not the chromatic color, the amount of coating of the precoat liquid per unit area to a first value or no precoat liquid is applied, and when the type of the print medium is the high quality paper or the textured base material and the base color is the chromatic color, or when the type of the print medium is the high quality paper or the textured base material and the base color is not the chromatic color, or when the type of the print medium is not the high quality paper and the textured base material and the base color is the chromatic color, the amount of coating of the precoat liquid per unit area is set to a second value larger than the first value.

* * * * *